United States Patent
Putkowski et al.

(10) Patent No.: US 9,599,226 B2
(45) Date of Patent: Mar. 21, 2017

(54) PRESSURE RELEASED WIPER ASSEMBLY FOR A SEALING ARRANGEMENT

(71) Applicant: SEAL ENGINEERING AS, Fredrikstad (NO)

(72) Inventors: Julian Putkowski, Nedgården (NO); Hans Fredrik Sandberg, Fredrikstad (NO)

(73) Assignee: SEAL ENGINEERING AS, Fredrikstad (NO)

( * ) Notice: Subject to any disclaimer, the term of this patent is extended or adjusted under 35 U.S.C. 154(b) by 0 days.

(21) Appl. No.: 14/893,829

(22) PCT Filed: Jun. 4, 2014

(86) PCT No.: PCT/NO2014/050091
§ 371 (c)(1),
(2) Date: Nov. 24, 2015

(87) PCT Pub. No.: WO2014/196869
PCT Pub. Date: Dec. 11, 2014

(65) Prior Publication Data
US 2016/0116065 A1  Apr. 28, 2016

(30) Foreign Application Priority Data

Jun. 4, 2013  (NO) .................................... 20130772

(51) Int. Cl.
*F16J 15/32*  (2016.01)
*F16J 15/16*  (2006.01)
(Continued)

(52) U.S. Cl.
CPC .......... *F16J 15/164* (2013.01); *F16J 15/064* (2013.01); *F16J 15/3204* (2013.01);
(Continued)

(58) Field of Classification Search
CPC  F16J 15/16; F16J 15/32; F16J 15/3204; F16J 15/3215
See application file for complete search history.

(56) References Cited

U.S. PATENT DOCUMENTS 4,277,072 A * 7/1981 Forch ..................... F16J 15/164
                                                    277/377
5,456,475 A * 10/1995 Abraham ............. B01D 33/801
                                                    210/171
(Continued)

FOREIGN PATENT DOCUMENTS

EP  1147925 A2  10/2001
GB  2217625 A  11/1989
(Continued)

*Primary Examiner* — Vishal Patel
(74) *Attorney, Agent, or Firm* — Birch, Stewart, Kolasch & Birch, LLP (57) ABSTRACT

A pressure released wiper assembly is arranged to fit into a ring-shaped groove in a cylinder or at a piston rod. The pressure released wiper with a V- or U-shaped cross section includes an opening in the axial direction to a potential contaminated side of the wiper assembly, a ring shaped base portion, a ring disk shaped rear portion, a lip portion, one or more through openings from the opening through the rear portion to a gap formed between the cylinder wall and the rod or piston outside the ring-shaped groove, and one or more filters covering at least the one or more through openings to the potential contaminated side of the wiper assembly in the filter holder.

16 Claims, 9 Drawing Sheets

(51) Int. Cl.
 *F16J 15/06* (2006.01)
 *F16J 15/56* (2006.01)
(52) U.S. Cl.
 CPC ....... *F16J 15/3212* (2013.01); *F16J 15/3236* (2013.01); *F16J 15/56* (2013.01)

(56) References Cited

U.S. PATENT DOCUMENTS

| | | | |
|---|---|---|---|
| 6,609,716 B2* | 8/2003 | Friend | F16J 15/164 |
| | | | 277/550 |
| 2006/0102246 A1* | 5/2006 | Clever | B67D 7/48 |
| | | | 141/206 |
| 2007/0063452 A1 | 3/2007 | Kurth | |
| 2007/0158917 A1* | 7/2007 | Paykin | F16J 15/3268 |
| | | | 277/551 |

FOREIGN PATENT DOCUMENTS

| | | |
|---|---|---|
| GB | 2340756 A | 3/2000 |
| NO | 129870 B | 6/1974 |
| WO | WO 9002278 A1 | 3/1990 |

* cited by examiner

PRESSURE RELEASED WIPER ASSEMBLY FOR A SEALING ARRANGEMENT

INTRODUCTION

The invention is a pressure released wiper assembly for a sealing arrangement, wherein the wiper assembly is placed in front of a sealing device, or a steering arrangement, and serves to keep the sealing and or steering arrangements clean.

More specific the invention is a pressure released wiper assembly with a filter for a cylinder sealing arrangement, primary for hydraulic cylinders, but to other systems as well, rotating or static, and also e.g. for pneumatic systems etc, wherein the wiper arrangement is placed in front of a cylinder packer and serve to keep contaminants and impurities, such as metal pieces, plastic ships and other impurities, away from the cylinder packer.

PRIOR ART

Seals are used in a lot of industrial applications and operating conditions. The effect of a seal and its lifetime depends of that it maintains unbroken, undamaged and got a minimal of wear. This is to a certain degree prevented by adapting material to the surrounding conditions of the installed sealing device, and the operating conditions for the sealing arrangement. A sealing arrangement in a system with movable parts will principally have a lubrication film.

The thickness of the lubrication film and the type of fluid is totally dependent on the industrial application, type of movement, speed, pressure, temperature and chemical conditions. In any case the lubrication film may contain impurities in the form of particles either brought in from the outer environment or occurred internally in the machinery caused by abrasion. Such particle material may damage a sealing device when it comes with the lubrication film. A damaged seal has to be replaced not to cause breakdown of the equipment, often with serious consequences, all depending of the process equipment in which the seal is arranged. Most of industrial equipment comprises parts where a sealing is involved, either hydraulic, pneumatic or other equipment in the range from hospital apparatus, production machinery to large heavy industries such as petroleum exploitation. Some examples of seals are linear rotating hydraulic and pneumatic actuators.

To ensure and/or extend the lifetime of a sealing, the fluid, which act as a lubrication film, should be kept clean. This may, to a certain degree, be carried out by the use of wipers, but may also be done by filtering the fluid.

Such a filter solution is described in GB2217625A. Described here is a filter fixed between an inner and an outer support ring arranged to be coupled with a sealing device to a complete sealing arrangement, and then to be mounted as a fully replacement for a seal.

Another sealing arrangement with a filter for sealing against a shaft is described in US 2007/0158917A1. This is a combination product by a seal with a filter arrangement integrated in the same unit, complex and assembled by many elements, and arranged to be mounted as a replacement for a conventional seal, primary for the motor industry.

Common to the prior art is that the filter unit is coupled to the sealing unit in such way that both the filter unit and the sealing unit is special designed to each other in a way that it complicates both production and maintenance. During maintenance the sealing unit also is affected, and to install a filter later on is not possible without affecting the whole sealing arrangement.

SHORT SUMMARY OF THE INVENTION

The invention is a solution of the above-mentioned problems, and is a pressure released wiper comprising a filter, a wiper assembly, for combination with a sealing arrangement, wherein the pressure released wiper with filter, i.e. the wiper assembly, is freely placed in front of a sealing device and serves to keep the sealing clean. Thus the wiper assembly does not comprise the actual sealing. The wiper assembly comprises a main body with through holes and at least a filter. The filter may be molded to the main body, fastened by a fastening device, such as a tension spring, glued to the main body, or be integrated to the tension spring. The wiper assembly may in an aspect be mounted into a rod/piston rod, and in another aspect be mounted into the cylindrical wall. The rod/piston rod and the cylinder wall may rotate or have a reciprocal movement respective to each other, or both rotating and reciprocal.

In one aspect the invention is a pressure released wiper assembly (1) for a cylinder with a rotating/or reciprocal relatively moving rod or piston (9) arranged to fit into a circular groove (15) in a cylinder wall (10) in said cylinders complete circumference, wherein the wiper assembly (1) comprises
- a ring-shaped filter holder (2), with a V- or U-shaped cross section with an opening (5) in the axial direction towards a potential contaminated side of the wiper assembly (1), and wherein the cross section comprises
- a ring-shaped base portion (11) in the groove (15),
- a ring disk shaped rear portion (12)
- a sealing lip portion (6) to the rod or piston (9),
- one or more through openings (7) from the opening (5) through the rear portion (12) to a gap formed between the cylinder wall (10) and the rod or the piston (9) outside the ring shaped groove (15),
- one or more filters (3) covering at least the one or more through openings (7) to the potential contaminated side of the wiper assembly (1) in the filter holder (2).

The invention consists of few components and is simple to produce and to mount, and may be mounted at existing equipment without any special accommodation. It is, by its trough holes and filter, pressure released. In this aspect the filtering arrangement is mounted in the cylinder wall.

In another aspect the invention is a pressure released wiper assembly (100) for a cylinder with a rotating/or reciprocal relatively moving rod or piston (9) arranged to fit into a circular groove (115) in the complete circumference of said rod or piston (9), wherein the wiper assembly (100) comprises
- a ring-shaped filter holder (102) with a V- or U-shaped cross section with an opening (105) in the axial direction towards a potential contaminated side of the wiper assembly (100), and wherein the cross section comprises
- a ring-shaped base portion (111) in the groove (115),
- a ring disk shaped rear portion (112)
- a sealing lip portion (106) to the rod or piston (9),
- one or more through openings (107) from the opening (105) through the rear portion (112) to a gap formed between the cylinder wall (10) and the rod or the piston (9), outside the ring shaped groove (115)

one or more filters (103) covering at least the one or more through openings (107) to the potential contaminated side of the wiper assembly (100) in the filter holder (102).

The invention consists of few parts and is simple to produce and to mount, and may be mounted in existing equipment without any special adjustments. It is, by its trough holes and filter, pressure released. In this aspect the filtering arrangement is mounted at the piston rod or the rod.

In an embodiment of the wiper assembly according to any of the two aspects the wiper assembly comprises a fastening device (4,104) for fastening the one or more filters (3,103) in the filter holder (2, 102). Advantage by such a fastening device is that the filter or the filters is stretched out and kept in place in the openings over the holes. The filter may be produced as a separate unit, and the type of filter may be freely chosen depending of the surroundings and the aim of the process where the assembly will be arranged, without special production of the total assembly.

In an embodiment of the wiper assembly, according to any of the two aspects the lip portion (6, 106) has a chamfering (61, 161) towards the surface (9, 10) on which the lip portion bear against. The chamfering forms an obtuse angle to the surface it bears against, and this angle is regulating the film thickness on the gliding surface, i.e. the lubrication film. The lip portion works as a wiper and it guides the potential contaminated fluid into the assemblies opening and through the filter (3, 103) and the through holes (7, 107) and back to the movable surface. A very thin lubrication film will remain at the movable element. This property is a further advantage to the invention.

FIGURE CAPTION

FIG. 2 shows a wiper assembly according to an embodiment of the invention and corresponds to the aspect also shown in FIG. 4 where the wiper assembly is arranged in a cylinder wall. FIGS. 1 and 4 shows different embodiments of this.

FIG. 1b is a perspective in an underside view of the same embodiment as shown in FIG. 1a.

FIG. 1d shows the section cut A-A' of FIG. 1a

FIG. 2 shows a wiper assembly according to an embodiment of the invention and corresponds to the aspect also shown in FIG. 4 where the wiper assembly is arranged in a cylinder wall. FIGS. 2 and 4 shows different embodiments of this.

FIG. 2b is a perspective in an underside view of the same embodiment as shown in FIG. 2a.

FIG. 2d shows the section cut A-A' of FIG. 2a

FIG. 3 shows a wiper assembly according to an embodiment of the invention and corresponds to the aspect also shown in FIG. 4 where the wiper assembly is arranged in a cylinder wall. FIGS. 3 and 4 shows the similar corresponding embodiments of this.

FIG. 3b is a perspective in an underside view of the same embodiment as shown in FIG. 3a.

FIG. 3d shows the section cut A-A' of FIG. 3a

FIG. 4. Show the invention in an aspect wherein the wiper assembly is designed for mounting in a cylinder wall (10).

FIG. 5. Show the invention in an aspect wherein the wiper assembly (100) will be mounted at a rod or a piston rod (9).

FIG. 5b shows the section cut A-A' of FIG. 5a

FIG. 6. Show the invention in an aspect wherein the wiper assembly (100) is in an aspect for arrangement on a rod, or a piston rod (9), and shows an embodiment wherein the filter (103) is moulded into the holder (102).

FIG. 6b shows the section cut A-A' of FIG. 6a.

FIG. 7 shows a filter (3) as an integrated part of the fixing device (4), that is the filter and the fixing device as a tension spring is the one and same unit, a filtering tension spring.

FIG. 8 shows the invention in an aspect where the wiper assembly is arranged for mounting in a cylinder wall (10) with the through holes pointing towards the center of the assembly and with the filtering tension spring, i.e. the filter (3), integrated into the fixing device (4) in place in the filter holder (2).

FIG. 8b is the section cut A-A' of FIG. 8a

EMBODIMENTS OF THE INVENTION

The invention is a solution to the problems by the prior art, both for filter and sealing arrangements, and is a filter arrangement for a sealing arrangement wherein the filter arrangement is free-standing and placed in front of a sealing and serves to keep the sealing and or steering arrangements clean. The wiper assembly comprises a main body with through holes and at least a filter. The filter may be moulded to the main body, fastened by a fastening device such as a tension spring or in a way glued to the main body or be integrated to the tension spring. The filter arrangement may in an aspect be mounted into a rod/piston rod and in another aspect be mounted into the cylindrical wall with a through running rod or piston rod.

The filter arrangement is designed to fit into a groove. Such a groove may for instance be a similar groove for which a wiper or an additional arrangement would have been placed, or a special designed groove for the filter arrangement.

The invention is in a first aspect a pressure released wiper assembly (1) for a cylinder with a rotating/or reciprocal relatively moving rod or piston (9) arranged to fit into a circular groove (15) in a cylinder wall (10) in said cylinders complete circumference, wherein the wiper assembly (1) comprises a ring-shaped filter holder (102) with a V- or U-shaped cross section with an opening (105) in the axial direction towards a potential contaminated side of the wiper assembly (100), and wherein the cross section comprises a ring-shaped base portion (11) in the groove (15), a ring disk shaped rear portion (12)

a sealing lip portion (6) to the rod or piston (9), one or more through openings (7) from the opening (5) through the rear portion (12) to a gap formed between the cylinder wall (10) and the rod or the piston (9) outside the ring shaped groove (15), one or more filters (3) covering at least the one or more through openings (7) to the potential contaminated side of the wiper assembly (1) in the filter holder (2).

The main portion (11) may be fully or partly tightening to the groove bottom (14) in the groove.

In another aspect the invention is a pressure released wiper assembly (100) for a cylinder with a rotating/or reciprocal relatively moving rod or piston (9) arranged to fit into a circular groove (115) in the complete circumference of said rod or piston (9), wherein the wiper assembly (100) comprises a ring-shaped filter holder (2) with a V- or U-shaped cross section with an opening (5) in the axial direction towards a potential contaminated side of the wiper assembly (1), and wherein the cross section comprises a ring-shaped base portion (111) in the groove (115), a ring disk shaped rear portion (112)

a lip portion (106) sealingly adjacent to the cylinder wall (10)

one or more through openings (107) from the opening (105) through the rear portion (112) to a gap formed between the cylinder wall (10) and the rod or the piston (9) outside the ring shaped groove (115), one or more filters (103) covering at least the one or more through openings (107) at the potential contaminated side of the wiper assembly (100) in the filter holder (102). The main portion (111) may be fully or partly sealing to the groove bottom (114) in the groove.

The two aspects of the invention is principally similar to each other but with the difference of that, among others, the lip portion and the through holes points in the first aspect towards the center of the ring shaped wiper assembly while in the other aspect those features points in the direction of the periphery of the ring shaped wiper assembly. In this way the two aspects, during operation, have the moving surface that they seal against in center and periphery respectively.

The wiper assembly is an additional unit for a cylinder sealing arrangement, primarily for hydraulic cylinders but for other systems as well. Such systems may be rotating or static systems and for instance pneumatic systems etc., as well. Characteristic for the invention is that the wiper arrangement is placed in front, at the potential contaminated side of a cylinder packer, and serve to keep contaminants and impurities such as metal pieces, plastic ships and other impurities away from the cylinder packer. The wiper assembly may also be used for systems where the cylinder is a rebore in a block, such as in an engine block.

All the properties and embodiments referred to below will be valid for both aspects of the invention, and the advantages will be valid for both the aspects, as well.

In an embodiment of the wiper assembly according to any of the two aspects, the wiper assembly comprises a fastening device (4,104) for fastening the one or more filters (3,103) in the filter holder (2, 102). Advantage by such a fastening device is that the filter, or the filters, is stretched out and kept in place in the openings over the holes. The filter may be produced as a separate unit and the type of filter may be freely chosen dependending of the surroundings and the process where the assembly will be arranged, without special production of the total assembly. The filter will have a ring disc design.

The filter may in an embodiment consist of more filter segments which covers the through holes. Those should then be fixed in place in a similar way as a whole/continuous filter.

In an embodiment of the wiper assembly, according to any of the two aspects, the lip portion (6, 106) has a chamfering (61, 161) towards the surface (9, 10) on which the lip portion bear against. The chamfering forms an obtuse angle to the surface it bears against. The lip portion works as a wiper and guides the potential contaminated fluid into the assemblies opening, through the filter (3, 103) and the through holes (7, 107) and back to the movable surface. A very thin lubrication film will remain at the movable element. This property is a further advantage to the invention. The lip angle is regulating the thickness of lubrication film.

With the lip portion and the adjacent portions pointed towards the moving element in the installation the lip portion works as a wiper and at the same time guide the potential contaminated fluid, for instance hydraulic oil, into the opening (5, 105) and through the filter (3, 103) and the slantwise through holes (7, 107) an back to the movable rod (9), piston rod (9) or the cylinder wall (10). A very thin lubrication film will remain at the movable element. An advantage by the invention is, distinctively from prior art, that it may be mounted into existing equipment such as in a space designed for a wiper. The invention is not a replacement for a sealing unit but is a supplement to a seal to prevent that the seal is unnecessary worn due to impurities in the fluid. Due to the through holes a pressure build up is prevented, and the through holes also ensure a self-cleansing by the reciprocal movement of the equipment wherein such wiper arrangements of the invention is especially advantageous. In distinction to prior art, wherein a filter is an integrated part of the sealing, the wiper assembly of the invention may be replaced without replacing the sealing. Another advantage by the invention is that it has a simple design with few components and is easy to manufacture.

Figures 4A, 4D, 4E:
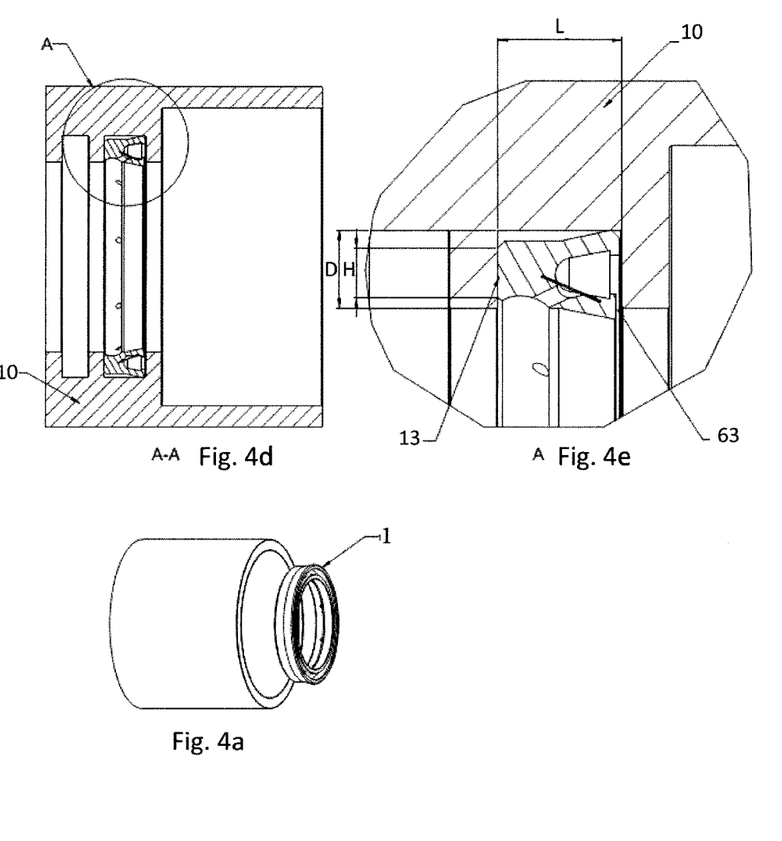
FIG. 4a is a perspective view of the wiper assembly for mounting in a cylinder wall (10).
FIG. 4d shows the section cut A-A' of FIG. 4c. Here it will be placed a sealing gasket to the left of the wiper assembly (not shown in the figure)
FIG. 4e is a closer detail drawing of the detail A of FIG. 4d and shows an embodiment of the invention where the fixing device (4) is moulded together with the filter in place in the bottom of the opening (5) and covers the through openings (7).
Figure 4B:
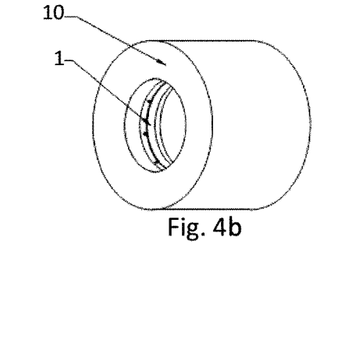
FIG. 4b is a perspective view of a part of a cylinder with a cylinder wall (10) and the wiper assembly arranged therein.
Figure 4C:
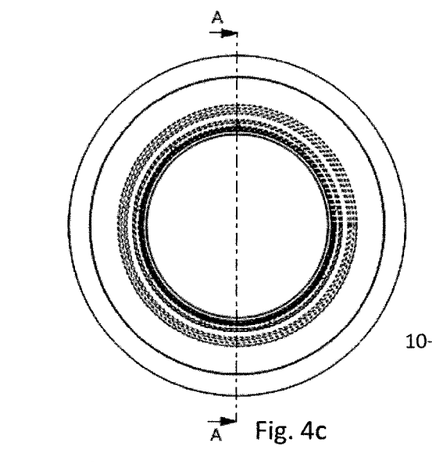
FIG. 4c is an end view of the cylinder of FIG. 4b with the wiper assembly (1) arranged.

In an embodiment of the invention the end wall (13,113) of the wiper assembly have a height (H) similar to or lower than the depth (D) of the groove, please see FIG. 4e. This is an advantage to prevent wear of the filter holder. If H is higher than D, one may see that the filter holder will be dragged into the necessary clearance between the cylinder wall and the piston or the piston rod. This will damage the filter holder and result in failure of filters function, and the following seal, that the wiper assembly should protect, has to be replaced at an earlier stage. At the same time it is an advantage that H is larger than the gap between the cylinder and the rod or piston rod to prevent the filter arrangement to come out of the groove (15, 115) and be drawn into the gap between the cylinder and the rod or piston.

In an embodiment of the wiper assembly according to the invention, in any of the two aspects, the fastening device (4,104) comprises a ring-shaped tension spring (41,141), which stretches out the filter (3,103), and fix the filter in the filter holder (2, 102). An advantage by the use of a tension spring might be the freedom to choose filters, which then will be a separate unit of the invention, as well. Thus, pre-production and mass production of the separate units for, to later on, choose the suitable mesh sizes and spring design depended on the kind of application, fluid type, pressure and temperature conditions etc. in which the invention may be used, becomes easy.

In an embodiment of the wiper assembly according to any of the aspects of the invention, the lip portion (6, 106) and the base portion (11, 111) comprise a gripper profile (62, 162) extending towards the opening (5, 105), arranged to hold the fixing device (4, 104) in the opening (5, 105). Such a gripper profile will contribute to hold the fixing device in place, even if the return flow of fluid through the filter causes a higher pressure to the filter than any tension spring fastening device (4, 104) may hold by its own tension. Such a gripping profile may also have an effect even if using a glued filter in a rigid material.

In an embodiment of the wiper assembly according to the invention in combinations with the different embodiments mentioned, the ring-shaped tension spring (41,141) is a resilient grid.

Figure 5A:
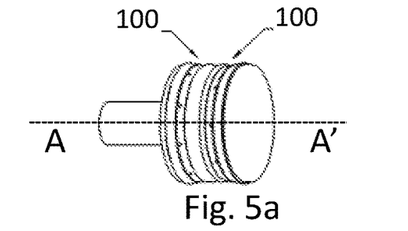
FIG. 5a is a perspective view of 2 wiper assemblies (100) at a piston rod (9).
Figure 5B:
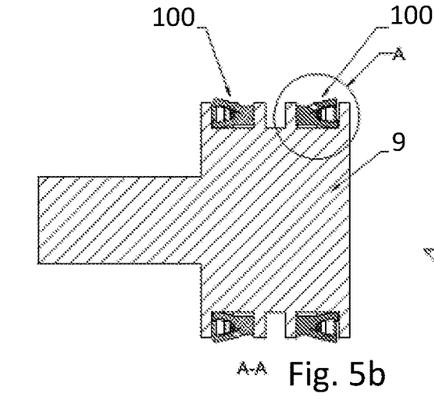
Figure 5C:
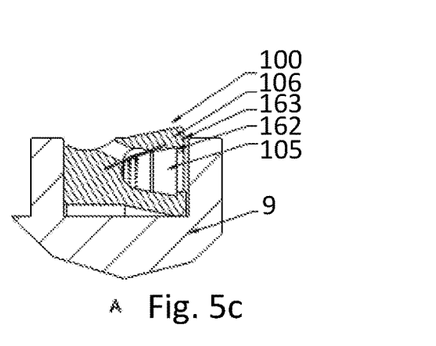
FIG. 5c is a section cut of the wiper assembly (100) and shows the filter (103).
Figure 6A:
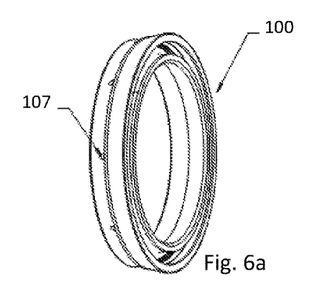
FIG. 6a is a perspective view of the wiper assembly (100).
Figure 6B:
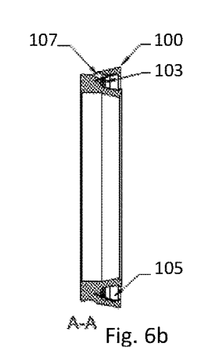
Figure 6C:
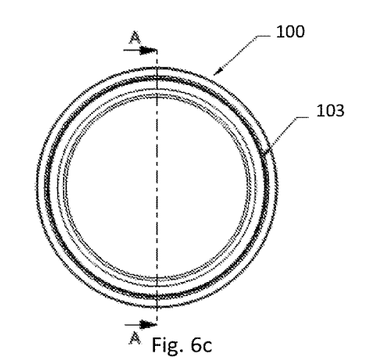
FIG. 6c is a top sketch of an embodiment according to the aspect for mounting at a rod/piston rod.
Figure 6D:
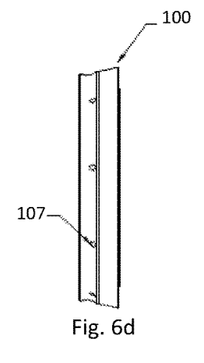
FIG. 6d is a side view of the same embodiment as shown of FIGS. 6a, 6b and 6c.
Figure 7A:
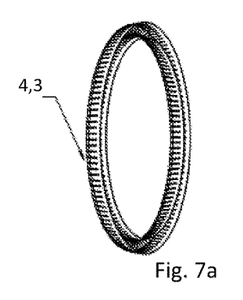
FIG. 7a is a perspective view of the filtering tension spring.
Figure 7B:
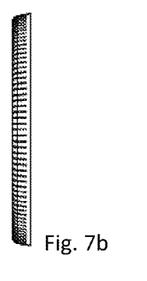
FIG. 7b is a side view of the same filtering tension spring.
Figure 7C:
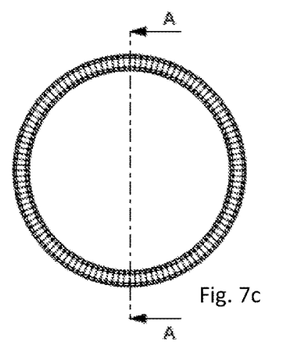
FIG. 7c is a top view of the same filtering tension spring.
Figure 7D:
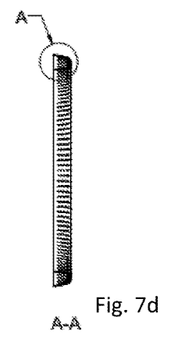
FIG. 7d shows the section cut C-C' of FIG. 7c
Figure 7E:
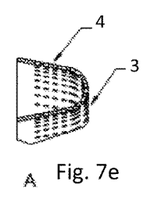
FIG. 7e shows the detail A of FIG. 7d and shows the e.g. milled out, punched, drilled or water- or laser-cut, etched or other ways recessed portions with filter (3), and slit or holed portions as a part of the tension spring (4).
Figure 8A:
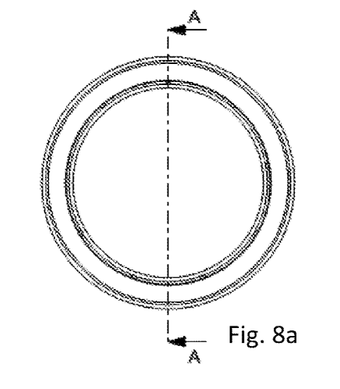
FIG. 8a is a bottom sketch of this embodiment of the invention.
Figure 8B:
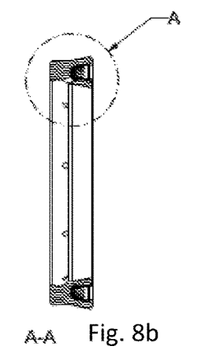
Figure 8C:
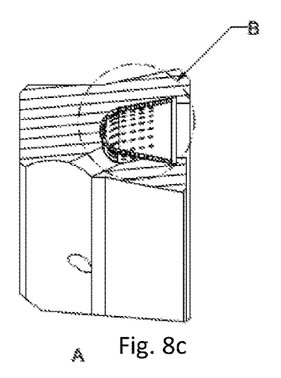
FIG. 8c shows the detail A of FIG. 8b and shows the fixing device (4) and the filter (3) as a filtering tension spring (3, 4)
Figure 8D:
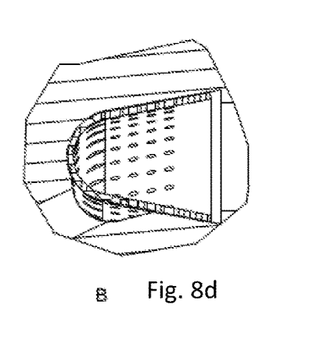
FIG. 8d is a closer detail drawing of the detail B of FIG. 8c.

In an embodiment of the wiper assembly according to any of the mentioned aspect of the invention, the filters (3, 103) are moulded together with the filter holder (2, 102) so as for forming one moulded unit. Thus the invention will consist of even fewer, separate, components and will be even easier to assemble than the embodiment for instance with a tension spring. Se FIG. 5.

Figure 1A:
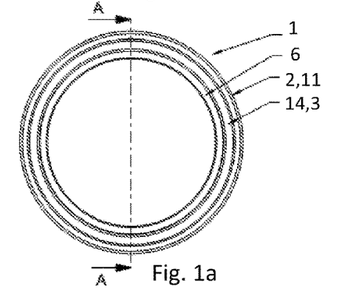
FIG. 1a is a top sketch of an embodiment of the invention without a filter (3) and a fastening device (4).
Figure 1B:
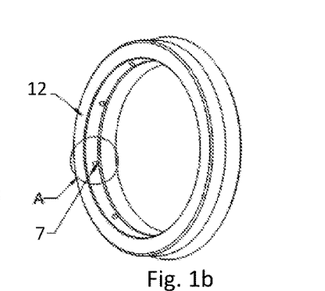
Figure 1C:
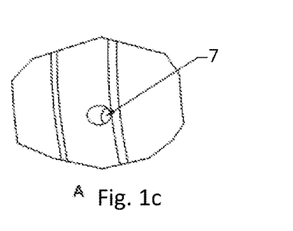
FIG. 1c is a detail drawing and shows the section A of FIG. 1b, and shows the design of a through opening (7).
Figure 1D:
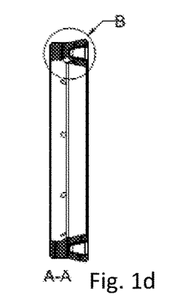
Figure 1E:
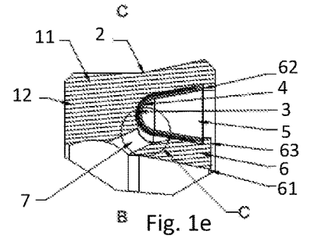
FIG. 1e shows the section B of FIG. 1d and shows an embodiment of the invention where the fixing device (4) is constituted by a ring-shaped tension spring placed over the filter (3) and covers the through openings (7).
Figure 1F:
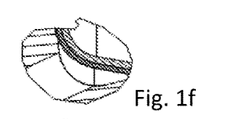
FIG. 1f is a closer detail drawing of the detail C of FIG. 1e.
Figure 1G:
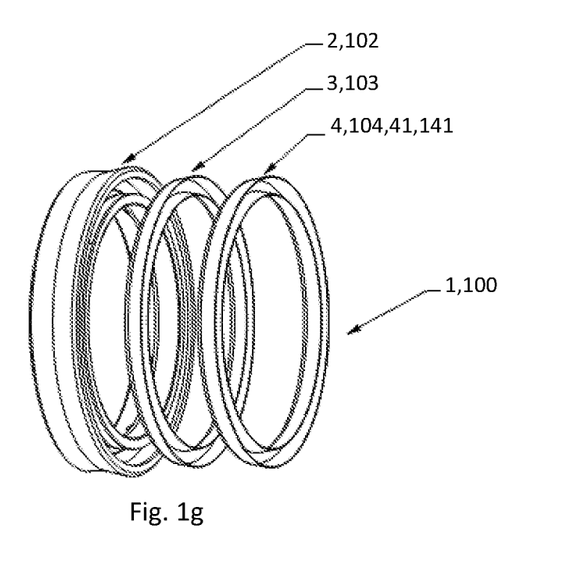
FIG. 1g is the wiper assembly in an exploded view, but to simplify the drawing the through holes are not shown.
Figure 2A:
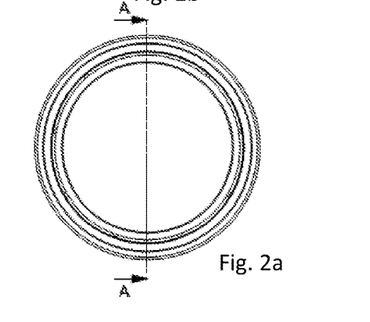
FIG. 2a is a top sketch of an embodiment of the invention without a filter (3) and a fastening device (4).
Figure 2B:
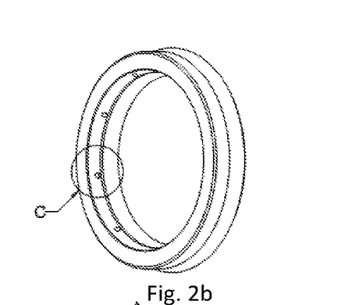
Figure 2C:
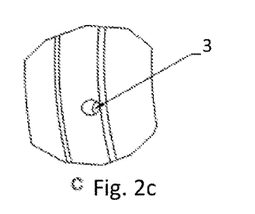
FIG. 2c is a detail drawing and shows the detail C of FIG. 2b, and shows the design of a through opening (7).
Figure 2D:
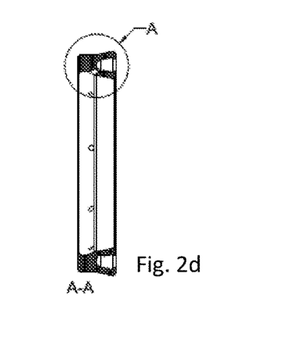
Figure 2E:
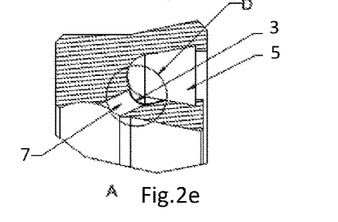
FIG. 2e shows the section B of FIG. 2d and shows an embodiment of the invention where the fixing device (4) is constituted by an invisible glue line, holding the filter in place in the bottom of the opening (5) and covers the through openings (7).
Figure 2F:
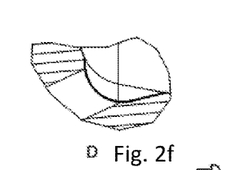
FIG. 2f is a closer detail drawing of the detail D of FIG. 2e.
Figure 3A:
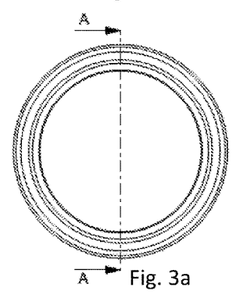
FIG. 3a is a top sketch of an embodiment of the invention and the moulded filter (4) is visible.
Figure 3B:
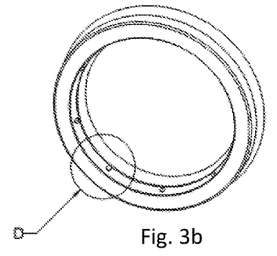
Figure 3C:
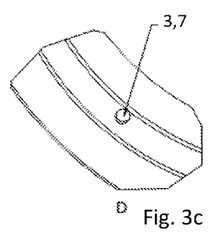
FIG. 3c is a detail drawing and shows the detail D of FIG. 3b and shows the design of a through opening (7) and the filter (4) is visible through the through opening (7).
Figure 3D:
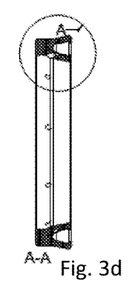
Figure 3E:
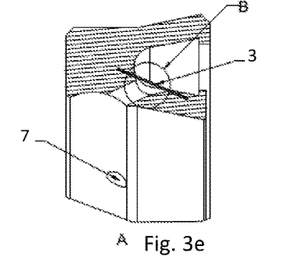
FIG. 3e shows the section A of FIG. 3d and shows an embodiment of the invention where the fixing device (4) is constituted by an, in the figure, invisible glue line holding the filter in place in the bottom of the opening (5) and covers the through openings (7).
Figure 3F:
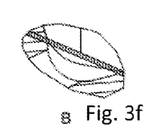
FIG. 3f is a closer detail drawing of the section B of FIG. 3e.

In an embodiment of the wiper assembly according to any of the mentioned aspect of the invention, the filter (3, 103) is an endless filter in its whole circumference. This is shown in FIG. 1g. An advantage of such an embodiment is that different filters in the correct sizes may be pre-produced and becomes easy to mount also when assembled into the desired production equipment. Embodiments with endless filters are relevant to both aspects of the invention and in embodiments with filters moulded, glued or fixed by tensioning.

In another embodiment of the wiper assembly according to any of the aspects of the invention, the filter (3, 103) comprises filter segments that at least covers the through openings (7, 107). By the use of filter segments, and not endless filter, one may save expensive filter material. The filter segments may be held in the filter holder either one by one, or they may be produced in an endless unit only with filter portions at the desired positions corresponding to the positions of the through holes (7, 107). The filter segments may be moulded into the holder, glued or fixed by stretching with a tension spring.

As mentioned above, in an embodiment, the filter (3, 103) may be an integrated part of the fixing device (4, 104). Desired portions of the tension spring may for instance, comprise filter segments, so that the fixing device and the filter is the one and same unit and not two separate components. An example to such a fastening device with an integrated filter is illustrated in FIG. 7. Here a tension spring with milled out, punched, drilled or water- or laser-cut, etched, or in other ways recessed portions with filter (3,) is shown. This simplifies the embodiment of the invention in regard to amount of separate units and components, which will give a simplified manufacturing and assembling.

In another embodiment of the invention the fixing device may be an adhesive instead of an additional separate component that is to be assembled. In other words, the filter either as an endless filter, or as filter segments, that only covers the through holes to the filter holder by an adhesive, such as glue, jointing paste, two-sided tape or some type of similar adhesive material which may join the parts together in a safe manner. In this way one may exclude, among others, more separate elements that may involve risking loosening parts.

In an embodiment of the invention the lip portion (6, 106) has an axial directing forward wall (63, 163) extending into the groove (15,115) in the operating condition. In this way one ensure the wiper assembly to be fixed, even under the reciprocal movement, by that the lip, if deformed, will stop against the outer edge of the groove (15), and thus, prevent the wiper assembly to be reversed out of the groove.

The invention consists of few components and is simple to produce and to mount, and may be mounted in existing equipment without any special accommodation.

The invention is well suited for mounting in an existing aperture for a seal.

The wiper assembly, according to the invention, is e protective and filtering unit for a fluid seal, wherein the filtering wiper arrangement is placed on the oil side of the fluid seal.

The filter arrangement of the invention is well suited for a cylinder sealing arrangement, primary for hydraulic cylinders but to other systems as well, rotating or static and also e.g. for pneumatic systems etc, wherein the filter arrangement is placed in front of a cylinder packer, and serves to keep contaminants and impurities, such as metal pieces and plastic ships, away from the cylinder packer. The wiper assembly according to the invention is well suited for a reciprocating piston/cylinder assembly but may as well be used for a rotating system.

The arrangement is mainly a ring disc shaped filter, fixed in a holder. The filter may be a filter cloth, a grid "mesh" or the like. The filter is manufactured in a suitable filter cloth material. The filter arrangement may be used in front of seals for all applications, such as single-acting or double acting piston cylinders where a pressure or alternatively, vacuum, is used for operating. The filter assembly may be used for small systems, as for instance instruments for medical use, as well as for off shore installations, with large diameters at the filter arrangement and the sealing arrangements. The choice of material and mesh size is depending on the operation environment, such as pressure, temperature, type of fluid etc.

The holder (2) has a lip portion (6) bearing against the rod/piston wall, and operates as a wiper as well as guiding the fluid into the filter. Internal diameter of the lip portion is produced a bit under-sized, depending of the material, to achieve a function like this. Fluid is further lead through the filter and the through holes. The through holes are aslant pointing back to the cylinder wall to ensure an even fluid flow. The wiper assembly according to the invention will at the same time leave a thin fluid film at the same cylinder wall. Accordingly, the lip portion (106), in a wiper assembly for arranging at the piston, should be produced a bit oversized.

Depending of the choice of material and the embodiment, the wiper assembly will be more or less elastic. The elasticity and the material choice are essential factors to evaluate with respect to mounting, durability and wear.

The invention claimed is:

1. A pressure released wiper assembly, for a cylinder with a rotating or reciprocal relatively moving rod or piston, configured to be freely placed and captured in a circular groove in a cylinder wall of said cylinder, the wiper assembly comprising:
   a ring-shaped filter holder with a V- or U-shaped cross section with a V- or U-shaped opening in an axial direction, said V- or U-shaped opening facing towards a potential contaminated side of the wiper assembly;
   one or more filters, and
   a fixing device,
   wherein the filter holder is one homogenous component and comprises:
      a ring-shaped base portion for arrangement in the groove;
      a ring disk shaped rear portion opposite the V- or U-shaped opening;
      a sealing lip portion configured to contact and bear against the rod or piston, the sealing lip portion having a sidewall defining the V- or U-shaped opening;
      one or more through openings formed on said sidewall and passing through the ring disk shaped rear portion, and configured to allow fluid flow between the V- or U-shaped opening, on the potential contaminated side, and a gap formed between the cylinder wall and the rod or the piston at a protected side, opposite to the potential contaminated side, via the through openings, and
   wherein said fixing device is releasably fixed to said ring-shaped filter holder and fixes said one or more filters in said ring-shaped filter holder, and said one or more filters are arranged to cover the one or more through openings.

2. The wiper assembly according to claim 1, wherein the lip portion has a chamfering for the lip portion end, to make a blunt angle to the surface of the rod or the piston or the cylinder wall.

3. The wiper assembly according to claim 1, wherein an end wall of the ring-shaped filter holder is configured to have a height equal or less than a depth of the groove.

4. The wiper assembly according to claim 1, wherein the lip portion and the base portion comprise a gripper profile extending towards the opening arranged to hold the fixing device or the one or more filters secured in the opening.

5. The wiper assembly according to claim 1, wherein the fixing device comprises a ring-shaped tension spring stretching the one or more filters out, and locking the one or more filters into the filter holder.

6. The wiper assembly according to claim 5, wherein the ring-shaped tension spring is a springy grid.

7. The wiper assembly according to claim 1, wherein the one or more filters, and the filter holder, constitutes a moulded unit.

8. The wiper assembly according to claim 1, wherein the one or more filters is a continuous filter in the complete circumference.

9. The wiper assembly according to claim 1, wherein the one or more filters comprises filter-segments covering at least the through openings.

10. The wiper assembly according to claim 1, wherein the lip portion has an axial directing forward wall that is configured to extend into the groove in a operating condition.

11. A pressure released wiper assembly, for a cylinder with a rotating or reciprocal relatively moving rod or piston, configured to be freely placed and captured in a circular groove in the complete circumference of said rod or piston, the wiper assembly comprising:
   a ring-shaped filter holder with a V- or U-shaped cross section with a V- or U-shaped opening in an axial direction, said V- or U-shaped opening facing towards a potential contaminated side of the wiper assembly;
   one or more filters; and
   a fixing device,
   wherein the filter holder is one homogenous component and comprises:
      a ring-shaped base portion for arrangement in the groove;
      a ring disk shaped rear portion opposite the V- or U-shaped opening;
      a sealing lip portion configured to contact and bear against the an inner wall of the cylinder, the sealing lip portion having a sidewall defining the V- or U-shaped opening;
      one or more through openings formed on said sidewall and passing through the ring disk shaped rear portion, and configured to allow fluid flow between the V- or U-shaped opening, on the potential contaminated side, and a gap formed between the cylinder wall and the rod or the piston at a protected side, opposite to the potential contaminated side, via the through openings, and
   wherein said fixing device is releasably fixed to said ring-shaped filter holder and fixes said one or more filters in said ring-shaped filter holder, and said one or more filters are arranged to cover the one or more through openings.

12. The wiper assembly according to claim 11, wherein the lip portion has a chamfering for the lip portion end, to make a blunt angle to the surface of the rod or the piston or the cylinder wall.

13. The wiper assembly according to claim 11, wherein an end wall of the ring-shaped filter holder is configured to have a height equal or less than a depth of the groove.

14. The wiper assembly according to claim 11, wherein the lip portion and the base portion comprise a gripper profile extending towards the opening arranged to hold the fixing device or the one or more filters secured in the opening.

15. The wiper assembly according to claim 11, wherein the fixing device comprises a ring-shaped tension spring stretching the one or more filters out, and locking it into the filter holder.

16. The wiper assembly according to claim 11, wherein the one or more filters, and the filter holder, constitutes a moulded unit.

* * * * *